United States Patent [19]

Amelio et al.

[11] 4,004,416
[45] Jan. 25, 1977

[54] INFRA-RED SUPPRESSOR FOR USE WITH TURBO-SHAFT ENGINE

[75] Inventors: Armand F. Amelio, Yonkers, N.Y.; Kenneth M. Rosen, Guilford, Conn.

[73] Assignee: United Technologies Corporation, Hartford, Conn.

[22] Filed: Mar. 16, 1970

[21] Appl. No.: 19,576

[52] U.S. Cl. .................. 60/264; 60/271; 239/127.3; 239/265.17; 60/39.66
[51] Int. Cl.[2] ............................................ F02K 3/04
[58] Field of Search ............. 60/265, 271, 39.66, 60/264; 239/127.3, 265.17, 265.19

[56] References Cited

UNITED STATES PATENTS

| | | | |
|---|---|---|---|
| 2,826,895 | 3/1958 | English | 60/39.66 |
| 3,210,934 | 10/1965 | Smale | 60/39.66 |
| 3,372,874 | 3/1968 | Colville et al. | 239/127.3 |

*Primary Examiner*—Samuel Feinberg
*Attorney, Agent, or Firm*—Vernon F. Hauschild

[57] ABSTRACT

An infra-red radiation suppressor adapted to be positioned to alter the flow of the exhaust gases of a turbo-shaft engine and sized to block view into the engine outlet and including self-pumping ejector means to cool the visible surfaces of the suppressor.

12 Claims, 5 Drawing Figures

INVENTORS
ARMAND F. AMELIO
KENNETH M. ROSEN
BY Vernon F. Hauschild
ATTORNEY

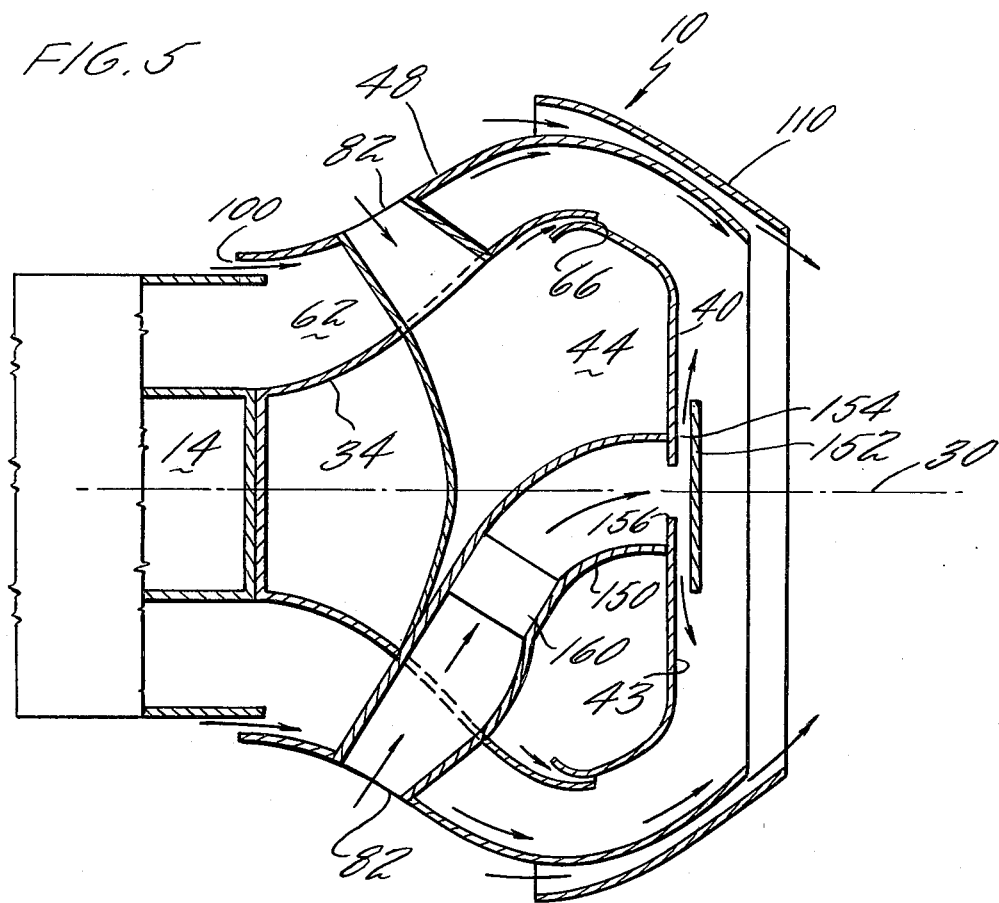
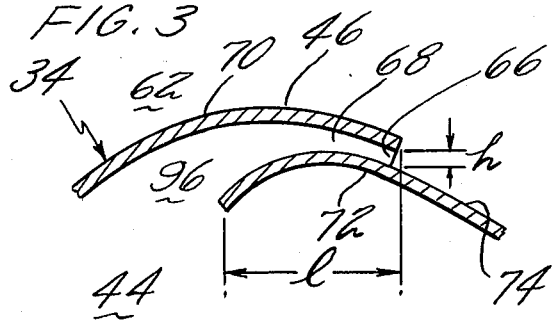
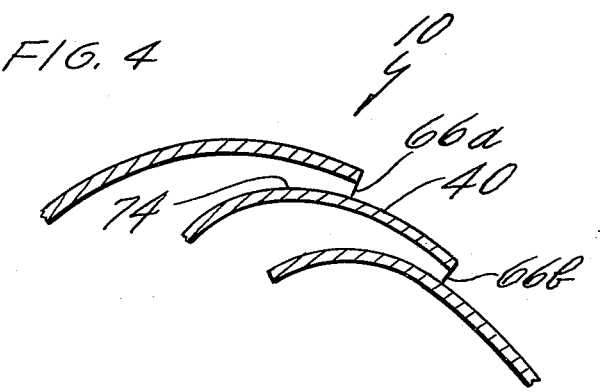

4,004,416

INFRA-RED SUPPRESSOR FOR USE WITH TURBO-SHAFT ENGINE

BACKGROUND OF THE INVENTION

1. Field of Invention

This invention relates to infra-red radiation suppression and more particularly to an infra-red radiation suppressor which is adapted to be mounted to block the view into the outlet of a turbo-shaft engine and to intercept and alter the flow of exhaust gases thereof and which includes self-pumping ejector mechanisms to provide cooling of the exposed suppressor parts.

2. Description of the Prior Art

During military combat it is common practice to utilize infra-red radiation seeking missiles and other destructive vehicles to seek out and destroy upon contact military flight vehicles which use propulsion mechanisms, such as turbo-jet or turbo-shaft engines or rockets, which operate at a sufficiently high temperature that the metal parts thereof emit significant infra-red radiation. The radiation emitted by the exhaust gases is largely attenuated by the atmosphere. In any case it has been found to be of less significance than that emitted by the exposed metal parts.

The infra-red radiation threat is fully described in U.S. Pat. No. 3,210,934, to which reference may be made.

Protection against this threat is accomplished by blocking the view into the engine outlet to prevent the infra-red radiation seeking devices from detecting the infra-red radiation emitting parts therewithin and by cooling exposed parts to prevent them from reaching the critical infra-red radiation emitting temperature which can be detected by the oncoming missile.

In the prior art, such as in U.S. Pat. No. 3,210,934, this exposed part cooling function is performed by apparatus which either needs a pressure source for the cooling fluid or which is ram-air responsive. The disadvantage of such systems is that devices which require pressure sources for providing pressurized cooling fluid to the exposed vehicle parts either require a separate pumping source with its attendant added weight and complication to the flight vehicle system, or require that pressurized engine compressor bleed air be utilized for this purpose, thereby reducing the power generating capability of the engine so bled. The devices which are ram-air responsive must not only be capable of being positioned so that some part thereof is in impinging contact with atmosphere to develop the ram-air effect, and this is not possible or practical in power generating devices which are positioned internally within the flight vehicle and, further, such ram-air responsive devices are inoperative when the flight vehicle is not moving forward at a substantial velocity. Accordingly, such ram-air responsive devices could not be utilized if the flight vehicle were a helicopter, which is capable of operating in many directions other than forward and which is further capable of operating in the hover mode, which mode is very important in many military situations.

It will therefore be seen that the prior art devices either add weight and complication to the overall system when a separate cooling fluid power source is utilized, or reduce the engine power generating capability when an engine generated pressure source, such as turbo-jet or turbo-shaft compressor, is bled to provide this cooling fluid. Further, ram responsive infra-red radiation suppressors are ineffective on helicopters during flight modes other than forward flight and the all-important military hover mode.

In addition, it has been suggested in the prior art that infra-red radiation suppressor parts be made completely porous so as to be able to use transpiration cooling, that is, the forced passage of cooling air through the various pores in the suppressor wall members. While transpiration cooling is accepted as an efficient method of cooling from a theoretical thermodynamic standpoint, film cooling is only slightly less efficient and has many advantages. Transpiration cooling is particularly unsuited for helicopter operation. The helicopter often lands and takes-off from unprepared areas and foreign matter, including dust and debris, fill the air and are injected into the engine and pass therefrom into the suppressor. The debris will attempt to pass with the air through the small 40 micron pores of the transpiration cooled suppressor members, thereby clogging these pores with foreign matter. With transpiration cooling, even if a complete clogging of all the pores is not encountered, localized infra-red radiating hot spots in the walls would be encountered in the localized clogged portions. In helicopter use, an attempt to keep the pores of a transpiration cooled suppressor absolutely clean in service would present very substantial maintenance problems. A further disadvantage of transpiration cooling is that the porous parts involved cannot be fabricated by conventional methods, as can the solid sheet metal parts of our suppressor. In addition, in a transpiration cooled system, it would be necessary, in some suppressor stations, to be discharging cooling air into a high static pressure region, and this would require the use of a positive pressure source. Still further, the partially clogged pores, or the partially clogged porous wall, offers increased resistance to cooling air flow therethrough and hence a greater positive pressure is required to cause the cooling air to pass through these restricted pores, therefore, transpiration cooling produces the undersirable need of an extremely high capacity pressure source capable of generating high pressure. To complicate the problem, we are not able to produce an even cooling effect over the entire surface of the suppressor due to irregular pore clogging problems. Contrary to the clogging problems presented by the transpiration cooled suppressor, the ejector slots of our suppressor are sufficiently large that they are not subject to clogging.

In addition, the prior art has taught infra-red radiation prevention by passing cooling air between closely positioned double walls of the suppressor parts to produce convection cooling thereof. Since there is substantial resistance to the flow of cooling air between two closely spaced walls of this type, very substantial air pressure is required to cause the air to flow therethrough with sufficient velocity to effectively cool the passage defining parts.

Contrary to the transpiration cooling and the convection cooling of the prior art, we are using primarily film cooling. Since film cooling produces a cooling air film between the suppressor parts and the hot exhaust gases to prevent heating of the suppressor parts, less air is used in such a system because it requires less air to prevent heating of suppressor parts by film cooling than it does to convectively cool suppressor parts which are directly scrubbed by the hot exhaust gases.

SUMMARY OF THE INVENTION

A primary object of the present invention is to provide an infra-red radiation suppressor for use with a turbine engine, such as a turbo-shaft engine, which both blocks view into the outlet of the turbine engine from all vantage points, which is mounted independently of the engine so as not to change the operating characteristics thereof and so as to be free from absorbing the vibrations and physical distortion therefrom, which includes no moving parts, and which includes a self-pumping, passive cooling system for the exposed suppressor parts to prevent them from reaching critical infra-red radiation emitting temperatures.

In accordance with the present invention, an infra-red radiation suppressor is provided for use with a flight vehicle which is operable during all modes of operation of the flight vehicle and which requires no cooling fluid pressure generating mechanism, with its attendant added weight, added complication and reduced reliability, and which does not depend upon engine generated pressure to cool the suppressor.

In accordance with the present invention, such a suppressor is provided and is made of sheet metal parts, all of which are capable of fabrication and repair by the use of conventional sheet metal fabricating methods and apparatus.

In accordance with still a further aspect of the present invention, such a suppressor is provided which defines an annular exhaust gas passage for the engine exhaust gases, which passage increases in cross-sectional area from its forward or upstream end to its after or downstream end so as to constitute a diffuser.

It is still a further object of the present invention to provide such an infra-red radiation suppressor which requires minimum cooling fluid flow and which is not prone to flow separation of the cooling fluid film and the adjacent exhaust gas flow from the suppressor parts over which it is flowing.

In accordance with a further aspect of the present invention, such an infra-red radiation suppressor is provided and includes an inner body or central plug enveloped within an outer casing such that these parts are supported in spaced relation to define an annular exhaust gas passageway therebetween and such that the selected curvature of the outer surface of the central plug, the inner surface of the outer casing and the midstream path of the annular passageway interact to induce the flow of a cooling air blanket along the outer surface of the central plug and to prevent flow separation of that cooling air blanket and the adjacent exhaust gas flow from the outer surface of the central plug.

In accordance with a further aspect of the present invention, an infra-red suppressor is provided which utilizes the ejector principle at at least one station in the suppressor.

In accordance with still a further aspect of the present invention, such a suppressor is provided which includes a self-pumping boundary layer control, film cooling slot at substantially the maximum diameter station of the central plug, which slot is defined between wall members in the central plug which cooperate to define a converging passage culminating in the slot, the length of which passage is approximately 10 times the exit height of the slot, thereby cooling the convergent passage defining walls by convection cooling, and so that the cooling air passing through the slot is uniform and positively accelerated to prevent local flow separation of the cooling air from the slot walls upstream of the slot exit and from the central plug wall downstream of the slot exit.

BRIEF DESCRIPTION OF THE DRAWINGS

FIG. 3 is in an enlarged cross-sectional showing through one of the ejector slots of the suppressor.

FIG. 4 is a plural slotted modification of the FIG. 3 construction.

FIG. 5 is a modification of the suppressor.

DESCRIPTION OF THE PREFERRED EMBODIMENT

Figure 1:
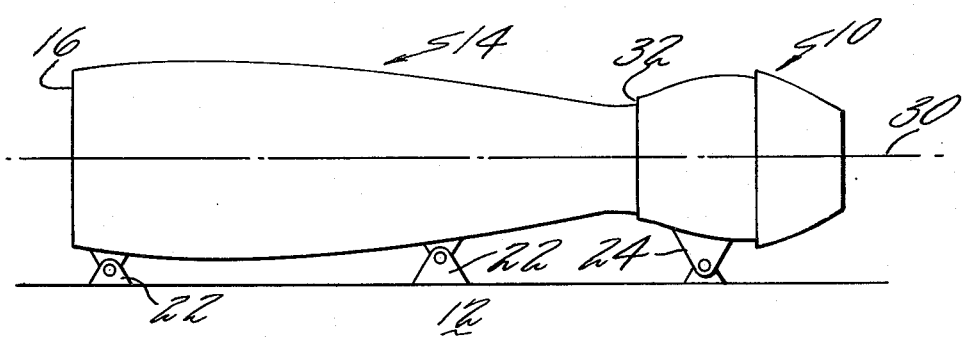
FIG. 1 is a side view of the infra-red radiation suppressor mounted from a flight vehicle in independent relation to a turbojet or turbo-shaft engine.

Referring to FIG. 1 we see infra-red radiation suppressor 10 mounted from flight vehicle 12, which may be a helicopter, independently of turbo-shaft or turbojet engine 14, which is also mounted from vehicle 12. Engine 14 and suppressor 10 may be mounted externally of the fuselage of vehicle 12, may be mounted in a conventional engine pod or may be completely immersed within the flight vehicle so that the only communication with atmosphere is to the inlet 16 of engine 14 and outlet 20 of suppressor 10. Engine 14 and suppressor 10 are independently mounted from vehicle 12 by conventional mounting lugs such as 22 and 24.

Engine 14 may be of the turbo-jet variety or turbo-prop variety more fully disclosed in U.S. Pat. Nos. 2,747,367 and 2,711,631 or may be of the conventional turbo-shaft variety more fully disclosed in U.S. Pat. No. 3,088,278. Conventionally, a turob-jet engine receives air through inlet 16, compresses that air in a compressor section, heats the air in a burner section, extracts sufficient power therefrom in a turbine section so as to drive the compressor section, and then exhausts the pressurized and heated exhaust gases to atmosphere so as to generate forward thrust. Conventionally, in a turbo-shaft engine, engine power is generated by the compressor-burner-turbine combination, either by the use of a free-turbine or a mechanical shaft connection, the engine power is utilized to drive a mechanism such as a helicopter rotor or aircraft propeller. In both instances, the exhaust gases which are discharged from the outlet 26 (See FIG. 2) of engine 14 are received in suppressor 10 and passed therethrough for discharge to atmosphere through suppressor outlet 20. Both engine 14 and suppressor 10 are preferably of generally circular cross-section and concentric about axis or centerline 30.

The leading edge, forward end or inlet 32 of suppressor 10 is larger than and envelopes the outlet 26 of engine 14 so as to intercept and encompass all exhaust gases being discharged therethrough and so as to completely block the view thereinto from any vantage point so that infra-red radiation seekers cannot detect the presence of infra-red radiation emitting hot metal parts, such as turbine or afterburner parts, therewithin.

Suppressor 10 is shown in greater particularity in FIG. 2 to which reference will now be made. Suppressor 10 includes central plug or inner body 34 which comprises a forward portion 36 including walls 38 which diverge away from axis 30. Plug 34 also includes after portion 40, whose walls 41 converge toward axis 30 and include radially extending rear wall 43 and also includes central portion 42 which smoothly connects forward portion 36 and after portion 40 and cooperates therewith to define plenum chamber 44 therewithin and the plug maximum diameter station 46.

Outer casing 48 envelopes plug 34 and includes forward portion 50 with walls 52 diverging away from axis 30, after portion 54 with walls 56 converging toward axis 30 to define suppressor outlet 20 concentrically thereabout and central portion 58 which smoothly joins forward portion 50 and after portion 54 and defines outer casing maximum diameter station 60 to be substantially in radially alignment with maximum diameter station 46 of plug 34.

Plug 34 and outer casing 48 may be made of conventional sheet metal parts and cooperate to define annular passageway 62 therebetween. In view of the divergent-convergent shape of plug 34 and outer casing 48, annular passageway 62 is also divergent-convergent with respect to centerline 30 in shape. However, annular passageway 62 increases in cross-sectional area between suppressor inlet 31 and suppressor outlet 20 so as to constitute a diffuser to the exhaust gas flow passing therethrough.

Central plug 34 includes circumferential, self-pumping, boundary layer control, film cooling, ejector slot 66, which is shown in greater particularity in FIG. 3. Slot 66 is positioned substantially at the maximum diameter station 46 of plug 34, and preferably slightly downstream thereof, so as to be located at a minimum static pressure region as discussed in greater particularity hereinafter. Viewing FIG. 3 we see that slot 66 constitutes the outlet of converging passage 68 defined between wall portions 70 and 72 of plug 34. In a fashion to be described in greater particularity hereinafter, cooling fluid, such as cooling air from plenum chamber 44 is caused to self-pump through converging passage 68 so as to increase the velocity thereof and to prevent flow separation from the adjacent walls of wall portions 70 and 72 and to thereby cool these wall portions by convection cooling and to be discharged therefrom through slot exit 66 to flow along the outer surface 74 of plug after portion 40 to provide a blanket of cooling air between surface 74 and the engine exhaust gases passing through annular passage 62. The height $h$ of slot exit 66 is selected to be about 1/10 of the length of passage 68 shown as $l$ so that uniform flow is established in the cooling air before discharge from slot 66.

Figure 2:
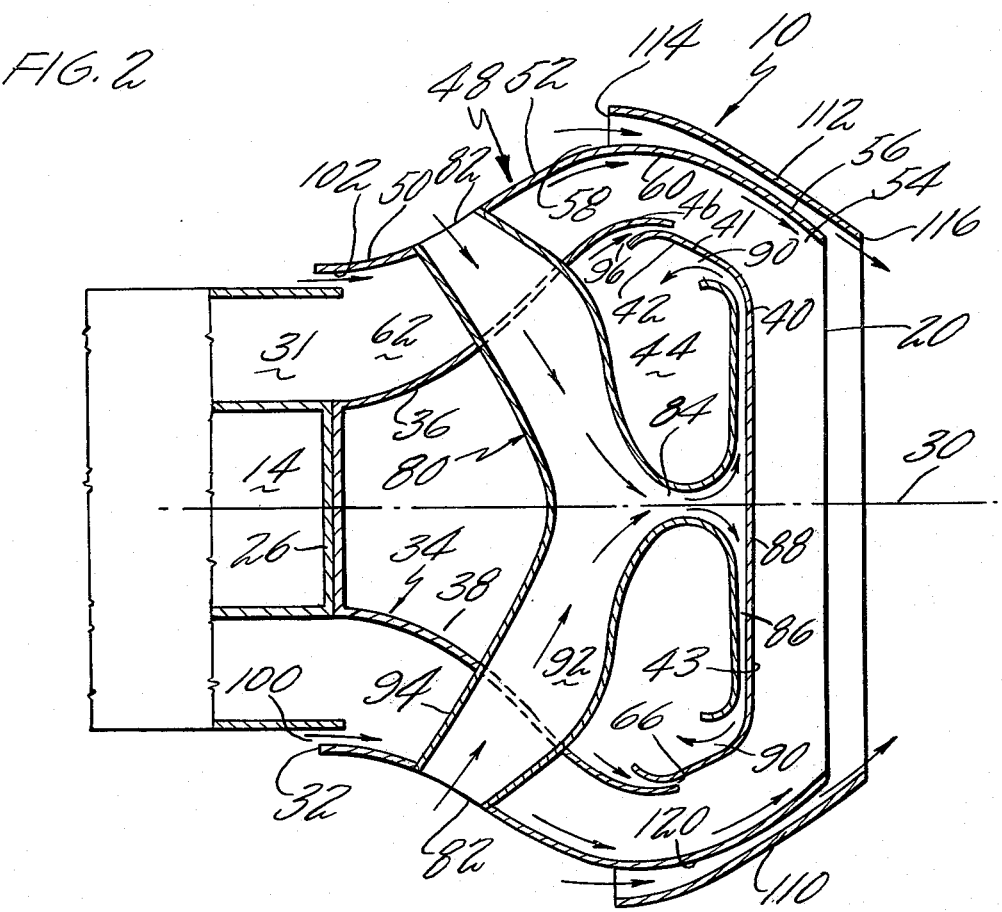
FIG. 2 is a large cross-sectional showing through the infra-red radiation suppressor in its preferred embodiment.

Again viewing FIG. 2 we will now consider how the cooling air gets to slot 66. Sealed gas passage defining means 80 communicates with atmosphere at a plurality of inlets 82. Sealed passage defining means 80 then extends across passageway 62 into plenum chamber 44 where it converges into minimum area throat section 84 which is concentric about axis 30 and extends therealong so as to be directed at and in close proximity to the inner surface of after portion 40. Sealed passage defining means 80 then projects substantially radially outwardly to cooperate with after portion 40 to define an annular convection cooling passage 86, to serve to cool the after face 43 of plug 34, and culminating in diffuser section 90 adjacent slot 66. It will accordingly be seen that sealed passage defining means 80 defines sealed passages 92 which communicates with atmosphere at inlets 82 and extends in sealed fashion into plenum chamber 44 so that cooling fluid, such as atmospheric air induced to flow thereinto will serve to cool the wall members 94 which extend across path 62 and will be accelerated to a relatively high velocity in passing through throat section 84 to impinge against the inner surface of after wall 88 provide local impingement cooling thereto due to the high velocity impingement and vigorous scrubbing of cooling air action thereagainst and then to flow through narrow passage 86 to convection cool after wall 88 and to be discharged therefrom through diffuser section 90 into plenum chamber 44 adjacent the inlet 96 to passage 68 and for discharge therefrom through ejector slot 66. The atmospheric cooling air will be caused to flow into sealed passages 92 and therethrough to slot 66 due to the pressure differential therebetween caused both by the selected curvatures of plug 34 and outer casing 48 to establish a minimum static pressure region at slot 66 and due to the ejector action established at slot 66 by the momentum interchange between the atmospheric cooling air and the exhaust gases passing thereby in passageway 62.

It is important to note that passage 92 is completely sealed from annular passageway 62 so as to place ejector slot 66 which is in the suppressor minimum static pressure region, into direct communication with the atmosphere at inlets 82. If cooling passage 92 were not a sealed passage, and if, for example, convective cooling passage 86 were communicating with annular passage 62 adjacent the rear face 43 of plug 34, it would be impossible to induce cooling air flow to slot 66 using the self-pumping ejector principle taught herein because annular passage 62 is at relatively high static pressure at this region, which static pressure is higher than atmospheric pressure, and hence exhaust gases would flow to slot 66. If passage 92 were not sealed, it would be necessary to furnish the cooling fluid from a pressure source higher than the pressure of annular passage 62 adjacent rear face plate 43 so as to force cooling air through passage 92, throat 84, convective cooling passage 86 and diffuser 90 to ejector slot 66. This communication with the exhaust gas passage is the failing of the prior art, such as U.S. Pat. No. 3,210,934, which failing requires that external pressure sources of the type described supra be used.

This selected curvature and its effect upon producing a cooling air film across the outer surface 74 (FIG. 3) of after portion 40 will be described fully hereinafter.

A second such ejector 100 is formed between the engine case at outlet 26 and the suppressor inlet 32. Ejector 100 communicates with atmosphere and also communicates with exhaust gas passage 62 so that the momentum interchange between exhaust gases passing thereby and the atmospheric air will cause a cooling film of atmospheric air to flow along the inner surface 102 of a casing 40 to provide film cooling thereto.

Radiation shield 110 envelopes the after portion 54 of outer casing 48 and cooperates therewith to define annular cooling air passage 112 therebetween. The forward end 114 of shield 110 communicates with atmosphere, while the after end 116 thereof envelopes suppressor outlet 20 and preferably extends slightly downstream thereof. When vehicle 12 is in forward flight, ram air will enter cooling air passage 112 to provide a layer of cooling air across the outer surface 120 of the duct outer portion. In addition, and at all times that exhaust gases are flowing through passage 62, the momentum interchange between the exhaust gases and atmosphere air in annular cooling passage 112 establishes a self-pumping ejector action of cooling air through passage 112 to continuously cool the surfaces 120 and 110.

It will accordingly be seen that the configuration shown in FIG. 2 discloses a suppressor which is cooled by utilizing a self-pumping ejector principle at at least three stations, namely, slot 66, suppressor section 100 and radiation shield passage 112.

As previously stated, annular exhaust gas passageway 62 is designed to be a diffuser in that the cross-sectional area thereof increases in a downstream or after direction. This shape is important because in a turbo-shaft engine, the objective is to reduce the pressure downstream of the turbine, thereby providing maximum pressure ratio across the turbine and hence maximum turbine power extraction to drive mechanisms such as helicopter rotors. It is a characteristic of a diffuser that the gases flowing therethrough, such as the exhaust gases flowing in our suppressor, and the mid-stream static pressure thereof, are increased as they flow in a downstream direction from the turbine engine to the exhaust outlet 20.

Actually, in our suppressor, due to the free vortex nature of the exhaust gas flow through passage 62, and because of the selected radii of curvature of the outer surface of the plug 34, the inner surface of outer casing 48, and the mid-stream flow path therebetween, if we were to take a static pressure profile across the cross-section of passageway 62 at any station therealong, we would find that the static pressure along the outer casing 48 is maximum and the static pressure along the surface of plug 34 is minimum. Due to this static pressure gradient and the diffusing nature of passage 62, previously described, the static pressure is constantly increasing along surface 74. The air which is flowing along surface 74 of plug 34 thereby encounters pressure resistance as it flows in a downstream direction and its natural tendency will therefore be to peel-off of or separate from the surface 74. This exhaust gas and cooling air flow separation from a streamline parallel to surface 74 is highly undersirable, not only because it gives a different radius of curvature for the flow of the exhaust gases along surface 74, and hence changes the static pressure differentials which have been designed into the suppressor but also this separation of the exhaust gas flow from a streamline parallel to surface 74 of plug 34 causes the loss of the cooling air blanket along surface 74 thereby permitting the hot exhaust gases from engine 14 to scrub against surface 74 and heat it to a point where plug 40 will reach a prohibited infra-red radiating temperature, which will, in turn, permit detection of this exposed infra-red radiating surface by an infra-red radiation seeking military vehicle.

These selected radii of curvatures of the central plug, the outer casing and the mid-stream exhaust gas path, and the flow patterns induced thereby, are necessary to induce the flow of the cooling air film or blanket through slot 66 and along surface 74 of plug 34 and also to maintain the adjacent exhaust gas flow, free of separation. This insures that a proper level of static pressure will exist at the slot exit 66, and that a sufficient quantity of cooling air will be induced so that the exhaust gases do not come in contact with these parts to heat them to the infra-red radiation creating danger point. Another consequence of separation of the exhaust gases is that the effective cross-sectional outlet of the suppressor is reduced, thereby building up a back pressure on the downstream side of the engine turbine to decrease the turbine pressure ratio, and hence the engine efficiency.

As stated previously, it is essential that ejector slot 66 be placed substantially at the suppressor plug maximum diameter station so that it is in a region of minimum static pressure to thereby establish a maximum pressure difference between inlet 82 of sealed cooling passage 92 and ejector slot 66, which is the outlet of that cooling air passage.

A low static pressure area results at the maximum diameter station of the plug due to the free vortex nature of the exhaust gas flow therepast. This low static pressure induces the cooling air to flow thru the ejector slot 66. The required level of static pressure at the slot, which is in the region of the plug maximum diameter station, is obtained in the following manner:

Assuming that the exhaust gas flow in annular passageway 62 between the plug and outer casing maximum diameter stations 46 and 60 is uniform, the incompressible equation of motion reduces to:

$$(1) \quad \frac{v}{r} + \frac{dv}{dr} = 0$$

where $v$ is the local free velocity tangential to a streamline with radium of curvature $r$.
integrating equation (1) yields $$(2) \quad \frac{dv}{v} = -\frac{dr}{r} \text{ or}$$

or $$(3) \quad \ln V = -\ln r + \ln C_1$$

Where $C_1$ is a constant of integration.
Equation (3) can be rearranged as $$(4) \quad \ln(vr) = \ln(C_1)$$

or $$(5) \quad vr = C_1$$

Equation (5) confirms that the flow is free vortex as opposed to the solid body rotation where $V/r = C$. Because the flow is uniform and irrotational $$(6) \quad \frac{dP_T}{dr} = 0;$$

when $P_T =$ a constant $= C_2$
Where $P_T$ is the total pressure measured along a streamline with local radius of curvature $r$.
Using the familiar Bernoulli relationship between total and static pressure.

$$(7) \quad P_T = P_s + \frac{\rho V^2}{2}$$

Where $P_s$ and $\rho$ are the local values of exhaust gas and density, respectively.
Combining equations (5), (6) and (7) yields the following equation which relates the local static pressure $P_s$ to the local value of radius of curvature $r$.

$$(8) \quad P_s = C_2 - \frac{\rho C_1'^2}{2r^2}$$

Therefore the static pressure at the midstreamline and that at the maximum diameter station of the central plug of the suppressor are respectively.

$$(9) \quad P_{s_{ms}} = C_2 - \frac{\rho C_1^2}{2r_{ms}^2}$$

and $$(10) \quad P_{s_{cp}} = C_2 - \frac{\rho C_1^2}{2r_{cp}^2}$$

where subscripts $ms$ and $cp$ refer to the midstreamline and the maximum diameter of the central plug, respectively, since the flow is considered to be approximately incompressible the density $\rho$ is a constant. Then subtracting equation (9) from equation (10) yields $$(11) \quad P_{s_{cp}} - P_{s_{ms}} = -\frac{\rho C_1^2}{2}\left[\frac{1}{r_{cp}^2} - \frac{1}{r_{ms}^2}\right]$$

Equation (5) gives the local tangential velocity along the midstreamline as:

$$V_{ms}\, r_{ms} = C_1 \quad (12)$$

Combining equation (11) and (12)

$$(13) \quad P_{s_{cp}} = P_{s_{ms}} - \frac{\rho V_{ms}^2}{2}\left\{\left(\frac{r_{ms}}{r_{cp}}\right)^2 - 1\right\}$$

Since $$\frac{\rho V_{ms}^2}{2} = \text{the local velocity head} = q_{ms}$$

$$(14) \quad P_{s_{cp}} = P_{s_{ms}} - q_{ms}\left\{\left(\frac{r_{ms}}{r_{cp}}\right)^2 - 1\right\}$$

Note that since $r_{ms}/r_{cp}$ is greater than 1.0

$P_{s_{cp}}$ will be less than $P_{s_{ms}}$

Thus the reduction in static pressure across annular passage (62) previously discussed is seen to be confirmed by analysis.

In practice a value of $P_{s_{cp}}$ must be obtained which is low enough to induce the required quantity of cooling flow through ejector slot 66.

This requirement establishes a specific radius of curvature ratio between the mid-streamline and the central plug defined by equation (14). The midstream static pressure $Ps_{ms}$ and the local velocity head $q_{ms}$ can be estimated from one dimensional aerodynamics since the total flow rate and the diffusing rate (local cross-sectional area) of annular 62 has previously been defined. Thus if $Ps_{ms}$ is known and the desired value of the static pressure at the central plug maximum diameter $P_{s_{cp}}$ is inserted in equation (14), the desired radius of curvature ratio can be calculated.

The radius of curvature of the outer wall $r_{ow}$ enters into the solution when it is realized that $$(15) \quad r_{ms} = \frac{r_{ow} + r_{cp}}{2}$$

Thus the radius of curvature of the outer wall, midstreamline and central plug are related by equation (14) and (15).

Note that the solutions evaluated above yield the acquired ratio of the radius of curvature, rather than the absolute values. In order to obtain the actual values of radius of curvature equations (14) and (15) must be combined with line of sight and the local cross-sectional area requirements of annulus 62.

With respect to the positioning of the ejector slot 66, it is important that it be positioned at about the maximum diameter station 46 of the plug for at least two reasons. First, all of the central plug surface upstream thereof would be masked from view and hence detection and therefore need not be cooled. Secondly, placing slot 66 at or near the maximum diameter position 46 thereby places it in the minimum static pressure region just described to thereby induce maximum cooling air flow therethrough.

It will therefore be seen that the suppressor disclosed in FIG. 2 utilizes the ejector principle at three stations to cause the cooling of the exposed suppressor parts principally by film cooling. For example, ejector 100 utilizes film cooling to cool the outer casing 48. Ejector 66 utilizes film cooling to cool a portion of the outer wall 74 of the center plug 34. It will be apparent to those skilled in the art that if surface 74 is an extended surface, a plurality of ejector slots would be utilized as needed, such as slots 66a and 66b of FIG. 4. In addition, radiation shield 110 cooperates with the outer casing 48 to cool surfaces 120 and 110 by convection cooling due either to ram effect and/or ejector action causing cooling air to pass through passage 112. Still further, the central part of the rear face 43 of plug 34 adjacent axis 30 is cooled by local impingement cooling of the cooling air stream impinging thereagainst at high velocity after passing through passage throat 84. The remainder of rear face 43 of plug 34 is cooled by convection cooling as the cooling air passes through convective cooling passages 86. All of these cooling systems are self-pumping and require no additional mechanisms or moving parts.

In installations where a cooling fluid pressure source is readily available, it would be possible to modify our suppressor as shown in FIG. 5 to provide film cooling along rear plate surface 43 of central plug 34. In the FIG. 5 embodiment, ejector 100, radiation shield 110 and ejector slot 66 operate as described in connection with the description of the FIG. 2 suppressor. The change in the FIG. 5 construction is that compressed cooling fluid, such as cooling air, is introduced from atmosphere or elsewhere into sealed conduit 150 within plenum chamber 44 so as to cause a high velocity stream of cooling air to locally impinge against plate member 152 which is supported in spaced relation to rear surface 43 of plug 34 so as to define annular convection cooling passage 154 therebetween. Before impinging against plate 152, the cooling air from sealed duct 150 is caused to pass through throttle or nozzle 156 so as to bring the air to maximum impinging velocity. After passing through annular convective cooling passage 154, the cooling air then flows along the remainder of the surfaces 43 of plug base plate 40 in film cooling fashion until it meets the film cooling air being discharged through ejector slot 66. Blower 160 is utilized to signify an external pressure source of any type, which could be a separate mechanism or the compressor of engine 14. In the FIG. 5 embodiment, it is important to note that plenum chamber 44 continues to be sealed off from annular exhaust gas passageway 62 so that ejector slot 66 is in direct communication with the atmosphere through inlets 82 thereto only.

We wish it to be understood that we do not desire to be limited to the exact details of construction shown and described, for obvious modifications will occur to a person skilled in the art.

We claim:

1. An infra-red radiation suppressor adapted to be positioned downstream of a turbo-shaft engine to intercept the exhaust gas flow therefrom and to be of sufficient size to block off view into the engine outlet and being concentric about an axis and having a forward inlet end to be positioned adjacent the engine outlet and an after outlet end and including:
   1. a central plug member having an outer and inner surface, a forward and after end, and including:
      a. a forward portion having walls diverging away from said axis,
      b. an after portion having walls converging toward said axis, and
      c. a central portion smoothly connecting said forward portion and said after portion and cooperating therewith to form a plenum chamber therewithin and the central portion defining the maximum diameter station of said plug with a diameter larger than the engine outlet with which the suppressor is intended for use,
      d. a circumferential extending ejector slot at substantially the maximum diameter station of the plug and opening toward the suppressor outlet,
   2. an outer casing having an outer and inner surface, a forward and after end, and spaced therefrom to define an annular passageway therebetween and including:
      a. a forward portion having walls diverging away from said axis,
      b. an after portion having walls converging toward said axis and terminating at the casing after end to define the outlet of the suppressor therearound, and
      c. a central portion smoothly joining said foreward portion and after portion to define the maximum diameter station of the outer casing substantially in radial alignment for the maximum diameter station of the central plug,
   3. ejector means located in said annular passageway adjacent said outer casing forward end and shaped to establish communication between atmosphere and the annular passageway so that engine exhaust gases passing through the annular passageway will cause a cooling film of atmospheric air to flow along the inner surface of the outer casing due to ejector action therethrough, and
   4. means defining a sealed passage between atmosphere and said ejector slot so that a cooling film of atmospheric air is caused to pass through said slot in ejector fashion and along the outer wall of the after portion of the central plug,
wherein said sealed passage extends from said outer casing, across said annular passageway, and into said plenum chamber and then along said axis to the plug after portion inner surface and then outwardly along said plug after portion inner surface to said circumferential ejector slot.

2. Apparatus according to claim 1 wherein said sealed passage defining means is shaped to define a diffuser section adjacent said circumferential ejector slot.

3. Apparatus according to claim 2 wherein said plug after portion extends radially with respect to said axis and wherein said sealed passage defining means defines an axially extending minimum diameter throat section concentric about said axis and positioned forward of said plug after portion inner surface so that the atmospheric cooling air passing therethrough impinges at high velocity against said plug after portion inner surface at said axis, and wherein said sealed passage defining means is positioned to cooperate with said plug after portion inner surface to define narrow, radially extending passages therebetween to said diffuser section.

4. Apparatus according to claim 3 and including a radiation shield enveloping the after portion of said outer casing and spaced therefrom to define an annular passageway therebetween and having a forward end communicating with atmosphere and an after end surrounding said suppressor outlet defined by said outer casing so that atmospheric cooling air is caused to pass therethrough both by ram-effect in forward flight and by ejector action due to the passage of the engine exhaust gases through the suppressor outlet.

5. Apparatus according to claim 2 wherein the circumferential slot ejector is defined between walls of the central plug member to have a height at its outlet equal to 1/10 of the length of the converging passage leading thereto.

6. Apparatus according to claim 5 wherein said annular passageway increases smoothly in cross sectional area from its forward end to its after end to form a diffuser.

7. A turbo-shaft engine having an exhaust gas outlet, an infra-red radiation suppressor positioned downstream of said turbo-shaft engine to intercept the exhaust gas flow therefrom and being of sufficient size to block-off view into the engine outlet and being concentric about an axis and having a forward inlet end positioned adjacent the engine outlet and an after outlet end and means supporting said engine and suppressor in independent relation and including:
   1. a central plug member having an outer and inner surface, a forward and after end, and including:
      a. a forward portion having walls diverging away from said axis,
      b. an after portion having walls converging toward said axis,
      c. a central portion smoothly connecting said forward portion and said after portion and cooperating therewith to form a plenum chamber therewith and the central portion defining the maximum diameter station of said plug with a diameter larger than the engine outlet with which the suppressor is intended for use, and d. a circumferential extending ejector slot at substantially the maximum diameter station of the plug and opening toward the suppressor outlet,
2. an outer casing having an outer and inner surface, a forward and after end, and spaced therefrom to define an annular passageway therebetween and including:
   a. a forward portion having walls diverging away from said axis,
   b. an after portion having walls converging toward said axis and terminating at the casing after end to define the outlet of the suppressor therearound, and
   c. a central portion smoothly joining said forward portion and after portion to define the maximum diameter station of the outer casing substantially in radial alignment for the maximum diameter station of the central plug,
3. ejector means located in said annular passageway adjacent said outer casing forward end and shaped to establish communication between atmosphere and the annular passageway so that engine exhaust gases passing through the annular passageway will cause a cooling film of atmospheric air to flow along the inner surface of the outer casing due to ejector action therethrough, and
4. means defining a sealed passage between atmosphere and said ejector slot so that a cooling film of atmospheric air is caused to pass through said slot in ejector fashion and along the outer wall of the after portion of the central plug, wherein said sealed passage extends from said outer casing, across said annular passageway, and into said plenum chamber and then along said axis to the plug after portion inner surface and then outwardly along said plug after portion inner surface circumferential ejector slot.

8. Apparatus according to claim 7 wherein said sealed passage defining means is shaped to define a diffuser section adjacent said circumferential ejector slot.

9. Apparatus according to claim 8 wherein said plug after portion extends radially with respect to said axis and wherein said sealed passage defining means defines an axially extending minimum diameter throat section concentric about said axis and positioned forward of said plug after portion inner surface so that the atmospheric cooling air passing therethrough impinges at high velocity against said plug after portion inner surface at said axis, and wherein said sealed passage defining means is positioned to cooperate with said plug after portion inner surface to define narrow, radially extending passages therebetween to said diffuser section.

10. Apparatus according to claim 8 and including a radiation shield enveloping the after portion of said outer casing and spaced therefrom to define an annular passageway therebetween and having a forward end communicating with atmosphere and an after end surrounding said suppressor outlet defined by said outer casing so that atmospheric cooling air is caused to pass therethrough both by ram-effect in forward flight and by ejector action due to the passage of the engine exhaust gases through the suppressor outlet.

11. An infra-red radiation suppressor adapted to be positioned downstream of a turbo-shaft engine to intercept the exhaust gas flow therefrom and to be of sufficient size to block-off view into the engine outlet and being concentric about an axis and having a forward inlet end to be positioned adjacent the engine outlet and an after outlet end and including:
1. a central plug member having an outer and inner surface, a forward and after end, and including:
   a. a forward portion having walls diverging away from said axis,
   b. an after portion having walls converging toward said axis, and having a flat rear surface and,
   c. a central portion smoothly connecting said forward portion and said after portion and cooperating therewith to form a plenum chamber therewithin and the central portion defining the maximum diameter station of said plug with a diameter larger than the engine outlet with which the suppressor is intended for use,
   d. a circumferential extending ejector slot at substantially the maximum diameter station of the plug and opening toward the suppressor outlet,
   e. an aperture in said after portion flat rear surface located on said axis,
2. an outer casing having an outer and inner surface, a forward and after end, enveloping said central plug and spaced therefrom to define an annular passageway therebetween and including:
   a. a forward portion having walls diverging away from said axis,
   b. an after portion having walls converging toward said axis and terminating at the casing after end to define the outlet of the suppressor therearound, and
   c. a central portion smoothly joining said forward portion and after portion to define the maximum diameter station of the outer casing substantially in radial alignment for the maximum diameter station of the central plug,
3. ejector means located in said annular passsageway adjacent said outer casing forward end and shaped to establish communication between atmosphere and the annular passageway so that engine exhaust gases passing through the annular passageway will cause a cooling film of atmospheric air to flow along the inner surface of the outer casing due to ejector action therethrough, and
4. means defining a sealed passage between atmosphere and said ejector slot so that a cooling film of atmospheric air is caused to pass through said slot in ejector fashion and along the outer wall of the after portion of the central plug,
5. a plate member positioned outside said central plug member and supported in spaced relation to said flat rear surface to form a cooling passage therebetween extending radially outwardly from said aperture and being of less radial dimension than said flat rear surface,
6. a cooling air pressure source, and sealed conduits means conducting cooling air from said pressure source through said plenum chamber to said aperture so that cooling air flowing therethrough would pass through said aperture at a high velocity and impinge against said plate member through flow through said cooling passage and against said flat rear surface as a cooling air film.

12. A turbo-shaft engine having an exhaust gas outlet, an infra-red radiation suppressor positioned downstream of said turbo-shaft engine to intercept the exhaust gas flow therefrom and being of sufficient size to block-off view into the engine outlet and being concentric about an axis and having a forward inlet end positioned adjacent the engine outlet and an after outlet end and means supporting said engine and suppressor in independent relation and including:
1. a central plug member having an outer and inner surface, a forward and after end, and including:
   a. a forward portion having walls diverging away from said axis,
   b. an after portion having walls converging toward said axis,
   c. a central portion smoothly connecting said forward portion and said after portion and cooperating therewith to form a plenum chamber therewith and the central portion defining the maximum diameter station of said plug with a diameter larger than the engine outlet with which the suppressor is intended for use, and
   d. a circumferential extending ejector slot at substantially the maximum diameter station of the plug and opening toward the suppressor outlet,
2. an outer casing having an outer and inner surface, a forward and after end, and spaced therefrom to define an annular passageway therebetween and including:
   a. a forward portion having walls diverging away from said axis,
   b. an after portion having wals converging toward said axis and terminating at the casing after end to define the outlet of the suppresor therearound, and
   c. a central portion smoothly joining said forward portion and after portion to define the maximum diameter station of the outer casing substantially in radial alignment for the maximum diameter station of the central plug,
3. ejector means located in said annular passageway adjacent said outer casing forward end and shaped to establish communication between atmosphere and the annular passageway so that engine exhaust gases passing through the annular passageway will cause a cooling film of atmospheric air to flow along the inner surface of the outer casing due to ejector action therethrough, and
4. means defining a sealed passage between atmosphere and said ejector slot so that a cooling film of atmospheric air is caused to pass through said slot in ejector fashion and along the outer wall of the after portion of the central plug,
wherein said sealed passage extends from said outer casing, across said annular passageway, and into said plenum chamber and then along said axis to the plug after portion inner surface and then outwardly along said plug after portion inner surface circumferential ejector slot, and
wherein said sealed passage defining means is shaped to define a diffuser section adjacent said circumferential ejector slot, and
wherein the circumferential slot ejector is defined between walls of the central plug member to have a height at its outlet equal to 1/10 of the length of the converging passage leading thereto.

* * * * *

UNITED STATES PATENT OFFICE
CERTIFICATE OF CORRECTION

PATENT NO. : 4,004,416
DATED : January 25, 1977
INVENTOR(S) : Armand F. Amelio
Kenneth M. Rosen It is certified that error appears in the above-identified patent and that said Letters Patent are hereby corrected as shown below:

| | |
|---|---|
| Column 1 | After "INFRA-RED SUPPRESSOR FOR USE WITH TURBO-SHAFT ENGINE" insert the following paragraph --The invention herein described was made in the course of or under a contract or subcontract thereunder with the Department of the Navy.-- |
| Column 6, line 54, | Delete "40" and insert -- 48 -- |
| Column 8, line 27, | Delete "radium" and insert -- radius-- |
| Column 11, line 54 | Delete "foreward" and insert -- -- forward -- |
| Column 15, line 29 | Delete "wals" and insert -- walls --. |

Signed and Sealed this

Twenty-fourth Day of May 1977

[SEAL]

Attest:

RUTH C. MASON
Attesting Officer

C. MARSHALL DANN
Commissioner of Patents and Trademarks